United States Patent [19]

Moore

[11] 4,126,777

[45] Nov. 21, 1978

[54] METHOD OF AUTOMATICALLY RETHERMALIZING PREVIOUSLY PREPARED FOOD FOR CONSUMPTION

[75] Inventor: Donald G. Moore, Glencoe, Ill.

[73] Assignee: Chemetron Corporation, Chicago, Ill.

[21] Appl. No.: 692,742

[22] Filed: Jun. 4, 1976

Related U.S. Application Data

[62] Division of Ser. No. 574,430, May 5, 1975, Pat. No. 3,999,027.

[51] Int. Cl.$^2$ ............................................. H05B 9/06
[52] U.S. Cl. ............................ 219/10.55 M; 426/234; 426/237; 426/241
[58] Field of Search ................. 219/10.55 M, 10.55 B; 99/425, 451, 353; 426/235, 234, 241-244

[56] References Cited

U.S. PATENT DOCUMENTS

| | | | |
|---|---|---|---|
| 2,501,400 | 3/1950 | Marshall | 219/10.55 M |
| 2,714,070 | 7/1955 | Welch | 426/234 |
| 3,302,632 | 2/1967 | Fichtner | 426/234 |
| 3,547,661 | 12/1970 | Stevenson | 219/10.55 B |
| 3,597,228 | 8/1971 | Jeppson et al. | 426/234 |
| 3,835,280 | 10/1974 | Gades et al. | 426/234 |
| 3,854,021 | 12/1974 | Moore | 426/234 |
| 3,875,361 | 3/1975 | Fukuii | 219/10.55 B |
| 3,936,626 | 2/1976 | Moore | 219/10.55 M |
| 3,985,990 | 10/1976 | Levinson | 426/234 |
| 3,985,992 | 10/1976 | Goltsos | 426/243 |

Primary Examiner—J. V. Truhe
Assistant Examiner—Bernard Roskoski
Attorney, Agent, or Firm—Vincent G. Gioia

[57] ABSTRACT

A control circuit is provided for a microwave oven in which a crystal rectifier is responsive to variations in the level of the electromagnetic field within the oven cavity when items of different energy absorption or reflection characteristics are placed in the oven. The electric current developed by the crystal is employed to generate a ramp type electrical signal which is compared with a fixed reference voltage to control the termination of microwave power to the oven. Compensation for the nonlinear relationship between crystal current and the level of the electromagnetic field within the oven is provided. In addition, compensation for the initial temperature of the food item which is placed in the oven is provided. Provision is also made for physically shaping and/or partially shielding individual food items relative to a reference food item so that the same triggering level of the control circuit is effective to bring all of the food items to the desired condition at different time intervals depending upon the field strength level within the oven which is established when the food item is placed therein.

5 Claims, 10 Drawing Figures

METHOD OF AUTOMATICALLY RETHERMALIZING PREVIOUSLY PREPARED FOOD FOR CONSUMPTION

Cross Reference to Related Applications

This application was simultaneously filed with and is related to co-pending applications Ser. No. 692,741 and Ser. No. 692,742, all of which are divisions of Ser. No. 574,430 filed May 5, 1975 which parent application has now become U.S. Pat. No. 3,999,027 issued to Donald G. Moore on Dec. 21, 1976 and assigned to the common assignee. This application is also related to U.S. Pat. No. 3,854,022 issued Dec. 10, 1974 to Donald G. Moore and assigned to the common assignee which is herein incorporated by reference.

BACKGROUND OF THE INVENTION

1. Field of the Invention

The present invention relates to microwave ovens, and, more particularly, to an electronic control system which may be used with microwave ovens and is particularly adapted for use in connection with ovens for restaurants, homes, or in vending apparatus. The present invention also relates to a method whereby such electronic control system may be employed in preparing food items for subsequent rethermalization or reheating on a fully automatic basis.

2. Description of the Prior Art

Various arrangements have been heretofore proposed for controlling the application of microwave energy to microwave ovens in the reheating or rethermalization of food items placed therein. One such arrangement is shown in my prior U.S. Pat. No. 3,854,022 issued Dec. 10, 1974 and assigned to the same assignee as the present invention, wherein a ferrite sensing element is provided on a tray carrying a number of food items which is placed in the microwave oven. The presence of a ferrite sensing element within the oven is detected by an arrangement which responds to the change from a ferromagnetic to a paramagnetic state when the sensing element has absorbed a predetermined amount of energy, by automatically terminating the application of power to the microwave oven.

While such an arrangement is suitable for its intended purpose and is particularly adapted for use in the institutional feeding field where such trays may readily be employed, in certain instances it is desirable to provide an arrangement which would not require a separate sensing element associated with each food item or tray of food items. Such an arrangement would have particular application for ovens used in restaurants, home or for vending apparatus employing microwave oven heating of food items. An arrangement is also disclosed in U.S. Pat. No. 3,875,361 which proposes to mount an energy absorbing member in the heating chamber which is in contact with a temperature sensing element to turn off the oven when the energy absorbing member has been heated to a predetermined temperature. However, such an arrangement suffers from the disadvantage that the energy absorbing member must be cooled down to the same starting temperature before the next heating operation can be performed.

Certain other microwave oven control arrangements have employed an essentially manual timing arrangement wherein a timing mechanism is manually adjusted to control the length of time microwave energy is applied to the food item. Such setting of the manual timer usually takes into account the size of the load, its water content and initial temperature and, based on experience an appropriate setting is selected.

In Schroeder U.S. Pat. No. 2,744,990 a timer control is initially set in accordance with the amount of microwave energy it is desired for the roast to absorb based on its gross weight. The Schroeder patent also proposes to measure the net microwave power absorbed by the roast by subtracting signals proportional to the forward and reflected microwave energy adjacent the microwave generator and employs this signal to drive the timer motor. While such an arrangement may provide some compensation for the shape of the food item, it does not provide automatic compensation for size or number of food items within the microwave oven cavity, nor does it eliminate the need for manual setting of the oven control.

Certain other arrangements have proposed the selective shielding of different food items on a tray so that all items on the tray will arrive at the desired temperature at the same time. Such arrangements are shown, for example, in Stevenson U.S. Pat. No. 3,547,661 and No. 3,615,713. However, such selectively shielded tray arrangements are not suitable for restaurants, home or vending use where, in many instances, a single food item is to be placed in the oven at one time. Furthermore, the control arrangements employed with such selectively shielded arrangements have generally employed a conventional manual timer which must be set to a different value for each tray of food items depending upon the shape, size, weight, etc. of the food items thereon.

It is, therefore, an object of the present invention to provide a new and improved electronic microwave oven control system which avoids one or more of the disadvantages of the above discussed prior art arrangements.

Another object is to provide a method of preparing packages of food items for subsequent rethermalizing in which selected food items are shaped and/or shielded such that each food item will reach a desired temperature when heated in a microwave oven under controlled condition.

Briefly, in accordance with one aspect of the invention, a crystal detector unit is positioned to develop an electrical signal proportional to the level of the electromagnetic field within the microwave oven when a food item to be heated is placed therein and this electrical signal is integrated to provide a ramp type electrical signal which is then compared with a fixed reference signal. Since the level of the electromagnetic field within the cavity varies with the size and number of food items which are being heated at the same time, the time required for the ramp type electrical signal to equal the reference signal will be automatically varied so that the food items are automatically brought to the desired condition at the time the microwave power is terminated. Integration of this electrical signal is accomplished by charging a capacitor at a rate proportional to the amplitude of the electrical signal and this capacitor starts discharging when the integrated signal equals the reference signal and microwave power is removed from the cavity. In accordance with a further aspect of the invention, the capacitor is then recharged after it has been discharged a predetermined amount so as to provide a second heating cycle following an equalizing cycle during which the microwave power is turned off. In accordance with another aspect of the invention, the charging rate of the integrating capacitor can be selectively varied to provide compensation for the initial temperature of the food item placed in the oven.

In accordance with a further aspect of the invention the electronic microwave oven control system may be employed to provide factory timed food items, by properly shaping and/or packaging of the food items so that all of the food items reach their desired but typically different temperatures at the same triggering level or setting of the reference voltage in the electronic control system. With this arrangement, the automatically timed food items may then be automatically brought to their desired temperatures by simply placing them in a remote oven, which may be in a restaurant, a home, or in vending apparatus, which is equipped with a similar electronic control system having the same triggering level adjustment as that employed in the factory timing operation.

BRIEF DESCRIPTION OF THE DRAWINGS

The invention, both as to its organization and method of operation, together with further objects and advantages thereof, will best be understood by reference to the following specification taken in connection with the accompanying drawings in which.

DESCRIPTION OF THE PREFERRED EMBODIMENT

Referring now to the drawings, the present invention is therein illustrated in conjunction with a microwave oven indicated generally at 20 provided with a microwave cavity 22 to which is supplied microwave power from a suitable source, such as one or more magnetrons. The cavity 22 is closed by means of a hinged door 24 which is provided with a suitable sealing arrangement so as to prevent microwave energy from escaping out of the cavity 22, as will be readily understood by those skilled in the art.

Figure 1:
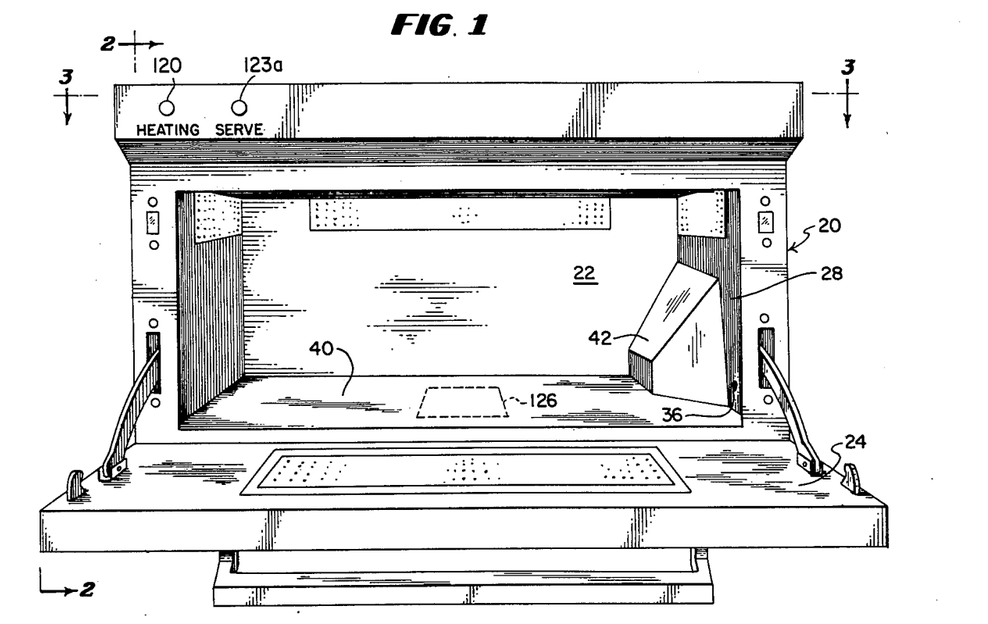
FIG. 1 is a front elevational view of a microwave oven embodying the principles of the present invention.
Figures 2, 5:
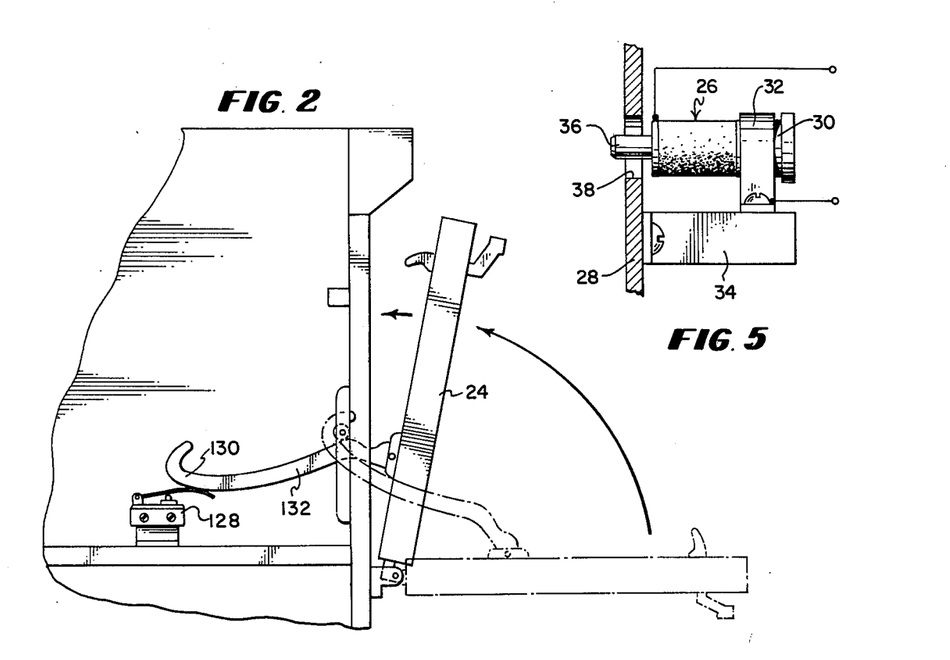
FIG. 2 is a sectional view taken along the lines 2—2 of FIG. 1.
FIG. 5 is a fragmentary sectional view showing the manner in which the crystal detector is mounted in the wall of the oven of FIG. 1.

In accordance with the invention, a field strength measuring device in the form of a crystal detector indicated generally at 26, is permanently mounted in one end wall 28 of the cavity 22. More particularly, as shown in FIG. 5, the metal cap 30 to which the anode of the crystal detector 26 is connected is mounted in a metal clip 32, which is in turn mounted on an insulating bracket 34 supported on the end wall 28 of the cavity 22 in such manner that the pin cathode electrode 36 of the crystal detector protrudes through an opening 38 formed in the end wall 28 so that the pin electrode 36 is exposed to the electromagnetic field which exists within the cavity 22 after the oven door 24 is closed and the magnetrons are energized, as will be described in more detail hereinafter.

Figure 3:
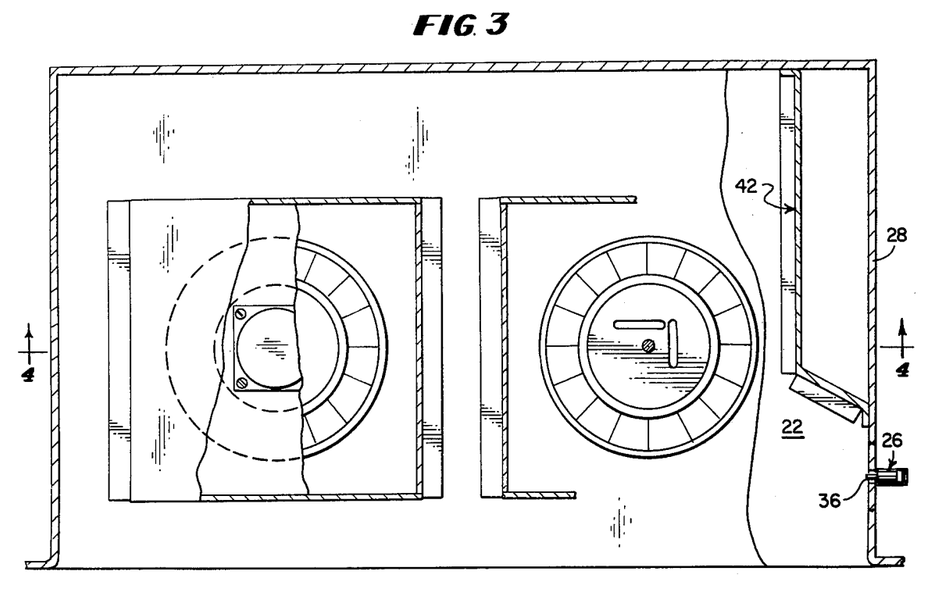
FIG. 3 is a sectional view taken along the line 3—3 of FIG. 1.
Figure 4:
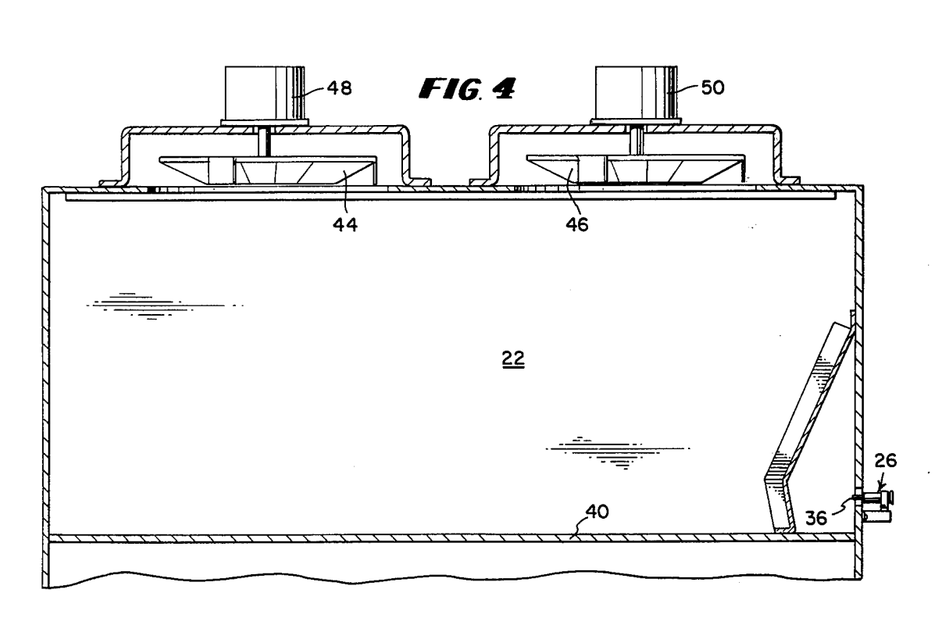
FIG. 4 is a sectional view taken along the lines 4—4 of FIG. 3.

The crystal detector 26 may be positioned at any desired location within the cavity 22, or in the wave guides leading from the magnetron to the cavity 22. However it is contemplated that the crystal detector 26 is positioned at such a location that it will be sensitive to changes in the strength of the electromagnetic field established within the cavity 22 when loads of different sizes are placed within the cavity. One such location which has been found to be satisfactory, is shown in FIGS. 3 and 4 wherein the crystal detector 26 is positioned on the end wall 28 a distance of one inch up from the conductive floor 40 of the cavity 22 and a distance of 2⅜ inches back from the front edge of the cavity 22, as shown in FIG. 3. In the illustrated embodiment, the cavity 22 is provided with an inwardly directed shield portion, indicated generally at 42, which projects into the cavity and forms a portion of the wall 28, this shielding portion 42 having some effect on the distribution of the electromagnetic field in the area of the crystal pin 36 which projects through the wall 28. Such a shielding member 42 is shown and described in detail in my U.S. Pat. No. 3,854,021 dated Dec. 10, 1974. However, it will be understood that other shielding arrangements may be employed, or other locations of the crystal detector 26 utilized to provide the desired control of the supply of electromagnetic energy to the cavity 22 as will be apparent from the following description thereof. In this connection it will be understood that the field distribution within the cavity 22 may also be influenced by other factors such as the rotatable vaned elements 44 and 46 which are mounted in the ceiling of the cavity 22 and are driven by the motors 48 and 50, the vaned units 44, 46 acting as mode stirring devices to produce a more uniform field distribution within the cavity 22, as will be readily understood by those skilled in the art.

Figure 6:
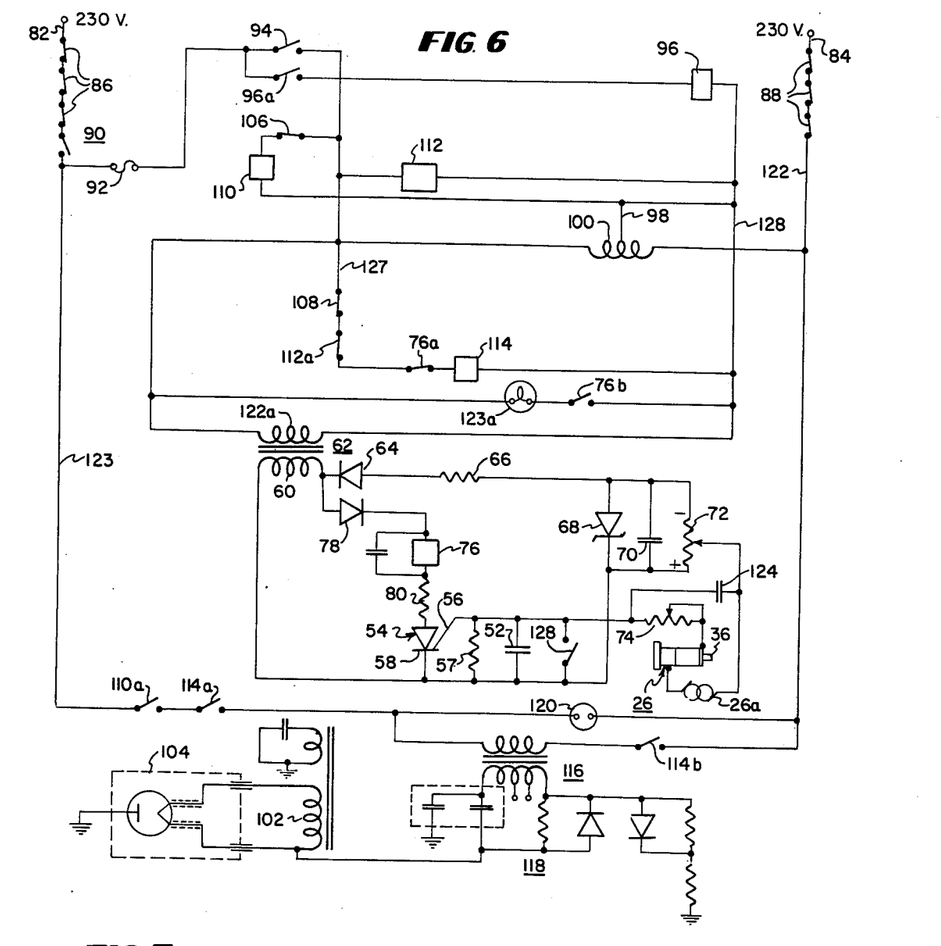
FIG. 6 is a schematic diagram of the control circuit arrangement employed in the present invention.

Considering now the manner in which the electrical current developed by the crystal 26 is employed to control the application of microwave power to the cavity 22, and referring to FIG. 6, the electrical current developed by the crystal 26 is employed to charge a large capacitor 52. A silicon controlled rectifier 54 is provided, the gate electrode 56 of this SCR being connected to one side of the capacitor 52 and cathode 58 of the SCR 54 is connected to the other side of the capacitor 52. The SCR 54 is normally nonconductive and may be triggered into a conducting state when the gate electrode 56 becomes positive with respect to the base by approximately 0.4 volt. To this end, a half wave rectifier 64 is connected from one end of the winding 60 through a resistor 66 to the anode of Zener diode 68 across which is connected a capacitor 70 and a level setting potentiometer 72. The other end of the winding 60 is connected to the base electrode 58 of the SCR 54 and to the elements 68, 70 and 72 so that a variable negative voltage is provided at the arm of the potentiometer 72. The anode of the crystal rectifier 26 is connected to the arm of the potentiometer 72 and the pin 36 (cathode) thereof, which acts as a probe or pickup device within the cavity 22. The anode of crystal 26 is further connected to one end of a series potentiometer 74 the other end of which is connected to the gate electrode 56 of the SCR 54, the SCR gate circuit being connected through a gate resistor 57. The current generated by the crystal 26 is diagrammatically illustrated as the equivalent series generator 26a in FIG. 6. When no microwave energy is supplied to the cavity 22 the crystal 26 is nonconducting and the capacitor 52 is discharged through the resistor 57. However, when microwave power is supplied to the cavity 23, the microwave voltage picked up by the pin the electrode 36 causes the crystal 26 to conduct on the positive half cycles of this voltage and charges the capacitor 52 positively through the potentiometer 74. The rate at which the capacitor 52 is charged may be varied by adjusting the potentiometer 74.

A ramp type electrical signal is thus developed across the capacitor 52 which has a slope proportional to the charging current generated by the crystal detector 26, which current is in turn proportional to the strength of the electromagnetic field within the cavity 22. When this ramp signal becomes sufficiently large, the gate electrode 56 of the SCR 54 becomes sufficiently positive to cause firing of the SCR 54. When this occurs current flows through a relay 76 which is connected to the power supply winding 60 through the diode 78 and to the anode of the SCR 54 through a resistor 80, so that the normally closed contacts 76a of this relay are opened while the normally open contacts 76b close.

It is pointed out that the integrating rate of the capacitor 52 may be varied by adjustment of the potentiometer 74. This rate may also be changed for a given level of electromagnetic field by employing a larger probe unit within the cavity 22 than the pin 36, or by moving the crystal 26 further into or out of the cavity 22. In the alternative, several crystals may be used at various points in the cavity. These crystals may be connected in parallel to give a larger available charging current and are also less sensitive to the position of food items in the cavity.

Considering now the manner in which power is initially supplied to the magnetrons which in turn develop the microwave power which is supplied to the cavity 22, it is first pointed out that a suitable interlock and control circuit arrangement is shown and described in detail in my issued U.S. Pat. No. 3,854,022 dated Dec. 10, 1974 which is incorporated by reference as stated above. It is also pointed out that in said issued patent two magnetrons are provided to supply microwave energy to the cavity, either one or both of these magnetrons being selectively energized, whereas in the circuit of FIG. 6 only a single magnetron has been illustrated, for purposes of simplification. Thus, in FIG. 6 a 230 volt supply is connected to the main buses 82 and 84 which is supplied through a series of interlock switches 86 and 88 to a main power switch 90. When this switch is closed the bus 82 is connected through the fuse 92 and a door operated switch 94 to a relay 96 which in turn is connected between a center tap 98 and one end of a primary winding 100 of a filament transformer. The secondary 102 of the filament transformer supplies filament power to the magnetron 104 shown enclosed by a broken line. When the relay 96 is energized the holding contacts 96a thereof are closed so that this relay remains energized even though the switch 94 may be energized only momentarily as the door is opened or closed. A pair of interlock switches 106 and 108 are closed when the door 24 is completely closed and latched with the result that a relay 110 is energized and the normally open contacts 110a thereof close. As soon as the switch 94 is initially closed, a time delay suitable for heating the filament of the magnetron 104 is initiated by time delay relay 112 and when this time delay is completed the contacts 112a of the relay 112 are closed so that a magnetron control relay 114 is then energized through the normally closed contacts 76a of the relay 76. When the relay 114 is closed its contacts 114a and 114b are closed so that 230 volts is supplied to the main power transformer 116 and high voltage is supplied to the magnetron 104 through the rectifier and filter network indicated generally at 118. When high voltage is thus supplied to the magnetron 104, indicator light 120 is lit so as to indicate to the operator that the microwave heating operation has been initiated.

As soon as the switch 94 is closed and the relay 96 actuated, 110 volts is supplied to the primary 122a of a power transformer 62 so that the above described crystal control circuit is energized and ready to begin the timing interval. However, until microwave power is supplied to the cavity 22, capacitor 52 remains uncharged.

When microwave energy is supplied to the cavity 22 in the manner described above, the crystal 26 develops an electrical current proportional to the strength of the electromagnetic field in the vicinity of the crystal and this current is employed to charge the capacitor 52. The value of this charging current is also dependent on the setting of the potentiometers 72 and 74. The capacitor 124 which is connected across the potentiometer 74 and crystal 26 acts as a filter capacitor so that an essential unidirectional current is provided for charging the capacitor 52. When the ramp type voltage across the capacitor 52 reaches the triggering voltage of the SCR 54, the relay 76 is energized and opens the contacts 76a thereof which deenergizes relay 114 so that the magnetron 104 is de-energized through the opening of contacts 114b. At the same time the normally open contacts 76b of the relay 76 are closed so as to energize the serving light 123a thereby indicating that the food item is ready to removed from the oven.

While energization of the relay 76 is effective to remove microwave power from the cavity 22, it is also necessary to discharge the capacitor 52 so that another timing operation may be effected in connection with a different food item or collection of items when they are placed in the cavity 22. In accordance with a further aspect of the invention, discharge of the capacitor 52 is accomplished by means of a switch 128 which is connected across the capacitor 52 and is closed momentarily as the door 24 is opened. More particularly, Referring to FIG. 2, the switch 128 is positioned so that it may be actuated by the rear hook portion 130 of a linkage member 132 connected to the door 24 and operating as a catch to hold the door horizontally when in an open position. As the door 24 is closed, the hook portion 130 closes the switch 128 momentarily, so as to insure that the capacitor 52 is discharged prior to the application of microwave energy to the cavity 22. Also, at the end of the timing interval, when the magnetron 104 is de-energized and the door 24 is opened, the switch 128 is again closed and is effective at this time to discharge the capacitor 52 quickly through the direct short circuit afforded by the closed contacts of this switch. This oven is thus immediately restored to a condition suitable to receive another food item and without the delay encountered in cooling a physical mass after it has been heated, as in U.S. Pat. No. 3,875,361.

In accordance with an important aspect of the present invention, the triggering level at which the SCR 54 is rendered conductive may be adjusted, by means of adjustment of either the series potentiometer 74 or the bias potentiometer 72, so that one of the food items to be heated, usually the food item requiring the longest time interval to be heated to the highest temperature, is brought to the desired condition when microwave power is turned off. The setting of this triggering level is thereafter maintained and the time interval is automatically corrected for other food items which are placed within the cavity 22 since the level of the electromagnetic field within the cavity will vary inversely with the size and the quantity of the food items to be heated. In addition, the food items may be individually shaped or shielded prior to placement in the oven so that the level of the electromagnetic field, as sensed by the crystal 26, is such that each food item will reach its desired condition at the time the triggering level of the SCR 54 is reached. In this connection it will be understood that this time interval will vary widely with different types of food items and with differently shaped or shielded food items, as will be described in more detail hereinafter. For example, it has been found that when different food items are placed at a generally central location indicated in dotted lines at 126 on the floor of the cavity 22 and with approximately 2,500 watts of microwave power being supplied to this cavity, the following different food items were automatically timed to the approximate desired condition for serving with the same triggering level setting:

Example No. 1
   Chicken-Rice Soup in Ceramic Bowl; 44° F. start, 198° F. finish; 39.5 seconds running time.
Example No. 2
   Fried Chicken, Mixed Vegetables and Mashed Potatoes in Foam Dish; all items 34° F. start, and finishing temperatures were 180° F. Chicken, 165° F. Mixed Vegetables; and 145° F. Potatoes; 53 seconds running time.
Example No. 3
   Scrambled eggs in sausage in ceramic dish, foiled covered; all items 34° F. start, finishing temperatures were 160° F. eggs, 180° F. sausage; 56 seconds running time.
Example No. 4
   Salisbury Steak, Mixed Vegetables and Mashed Potatoes in Foam Dish, Plus Chicken-Rice Soup in Ceramic Bowl; items in Foam Dish all 34° F. at start; finishing temperatures were 180° F. Steak, 170° F. vegetable, and 155° F. potato; Chicken-Rice Soup was 44° F. start and 190° F. at finish; 102 seconds running time.

In the above examples, the crystal 26 was a type 1N21B, the capacitor 52 had a value of 14,000 microfarads and the SCR gate resistor 57 had a value of 5,700 ohms. The series potentiometer 74 had a maximum value of 5,000 ohms. It should also be noted that a smaller oven than that illustrated may be employed to heat individual food items.

All of the above examples were timed automatically without changing the value of the capacitor 52 or adjustment of the potentiometers 72 or 74. Also, no individual sensor for each food item or tray is required, as in my prior U.S. Pat. No. 3,854,022. Accordingly, the arrangement of the present invention is particularly suited for restaurant and home use, or use in vending apparatus, wherein food items may be placed directly within the microwave cavity and automatically timed to the desired condition for consumption through the use of the above described crystal control circuit.

Figure 7:
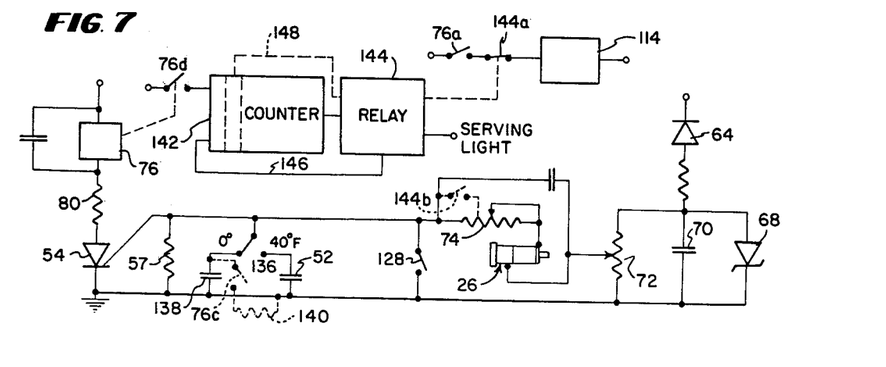
FIG. 7 is a schematic diagram of an alternative control circuit of the invention.

While the crystal control circuit of the present invention is effective to provide automatic timing of different types of food items, as illustrated by the above examples, it is pointed out that since the crystal 26 remains at all times within the cavity 22, it cannot respond to the initial temperature of the food item which is placed within the cavity 22, as does the tray-carried ferrite sensor shown in my prior U.S. Pat. No. 3,854,022. Accordingly, in the crystal control circuit of the present invention it may be desirable under certain conditions to provide for adjustment of the slope of the ramp type signal to compensate for variations in the initial temperature of the food item. Such an arrangement is shown in FIG. 7 wherein an initial food temperature switch 136 is provided which has two positions, one for 0° F. food items and the other for 40° F. food items. When the switch 136 is in the 40° F. position the capacitor 52 is connected into the circuit and functions in the manner described in detail heretofore in connection with FIG. 6. However, when the switch 136 is in the 0° F. position a different capacitor 138 is substituted for the capacitor 52, the capacitor 138 having a substantially larger value so as to provide additional heating time for frozen food items. In the alternative, the food temperature switch may be connected to change the value of the series potentiometer 74, or may adjust the setting of the potentiometer 72 so as to provide for a longer heating interval for frozen food items. Neither alternative modification is shown in the drawings.

In accordance with a further aspect of the invention, an arrangement may be provided for automatically re-applying microwave power to the cavity 22 after it has been initially terminated by opening of the contacts 76a, after a suitable equalizing cycle during which the heat generated in the hotter portions of a food item within the cavity is allowed to spread out into other portions of the item to provide a more uniform heat distribution therein. Such an equalizing cycle may be provided either for 0° F. items or for 40° F. food items, although such an equalizing cycle is more important for 0° F. food items in which equalization between frozen and thawed portions of the food is desirable. To this end another set of normally open contacts 76c may be provided on the relay 76 which function when this relay is energized to connect a resistor 140 across the capacitor 138, as shown in dotted lines in FIG. 7. Thus, in sequence when power is initially removed from the magnetron 104 by opening of the contacts 76a, the resistor 140 is placed across the capacitor 138 and functions to discharge this capacitor an amount such that the SCR 54 is again rendered nonconductive. When this occurs, the contacts 76a again close so that power is re-applied to the magnetron 104 and microwave power is again supplied to the cavity 22. The resistor 140 is removed from across upon the reapplication of microwave energy the capacitor 138 by opening of the contacts 76c so that this capacitor can be again charged until the SCR 54 is again rendered conductive.

A number of such equalizing cycles may be automatically established by providing another set of contacts 76d on the relay 76, these contacts being closed each time that the relay 76 is energized so that a suitable input voltage is applied to a counter 142 each time the relay 76 is energized. The counter 142 may comprise any suitable arrangement, such as a conventional stepping relay, for counting the number of times the relay 76 has been energized and once this counter has reached a predetermined count the output thereof is supplied to a relay 144. When the relay 144 is energized it controls the normally closed contacts 144a thereof which are in series with the contacts 76a of FIG. 6 so that after a predetermined number of equalizing cycles have been produced, as determined by the setting of the counter 142, the relay 114 is de-energized independently of the contacts 76a. The relay 144 may also control energization of the serving light 123 and functions to reset the counter 142 through the conductor 146 at the time that power is permanently removed from the magnetron 104. Either the capacitor 52 or the capacitor 138 is again completely discharged by closure of the switch contacts 128 when the door 28 is opened at the end of the heating operation.

It is also contemplated that short bursts of microwave power may be supplied to the cavity 22 for maintaining load temperatures during a holding cycle after the serving light has been lit. With such an arrangement, the relay 144 is controlled from the first or second stage of the counter 142, as indicated by the dotted line 148 in FIG. 7 so that this relay is energized and the serving light is lit at the end of one or two equalizing cycles. However, the contacts 144a are replaced by a pair of relay contacts 144b of the relay 144 which are employed to short out a portion of the series potentiometer 74, as indicated in broken lines in FIG. 7, so that either of capacitors 52 or 138 depending upon the position of food temperature switch 136, is charged to the firing level of the SCR 54 quite quickly. Under these conditions the relay 144 does not reset the counter over the conductor 146 but instead the counter 142 continues to be stepped to successively higher settings as microwave power is applied to the cavity 22 in short bursts during the holding cycle. After twenty or thirty cycles of the counter, during which short bursts of energy are applied to the cavity 22, the output of the counter 142 may then be supplied to an output control relay (not shown) whose contacts control de-energization of the relay 96 (FIG. 6) instead of the contacts 144a of the relay 144 to shut down the oven completely. Such an output control relay would also reset the counter 142, as will be readily understood by those skilled in the art. It will also be understood that the short bursts of energy may be provided by substituting a relatively small capacitor for one of the capacitors 52 or 138, by closure of switch contacts similar to 144b, during the series of holding cycles.

Considering again the crystal control circuit arrangement of FIG. 6, it is pointed out that if both the capacitor 52 and crystal 26 are operated on the linear portion of their characteristics, the rate at which this capacitor is charged will vary linearly with changes in the strength of the electromagnetic field within the cavity, as sensed by the crystal 26. However, changes in the field strength level may not be directly proportional to the size of the food load which is placed in the cavity 22. For example, if two food items of equal size shape and energy absorption qualities are placed in a cavity receiving a constant power input, the microwave energy absorbed by each of these two items will be half that which would be received by one of the items in the cavity alone. However, with the two food items the field strength level will be reduced to only 0.707 of the value for one food item since the voltage level varies as the square root of the power level change. Accordingly, it will be seen that with the crystal control arrangement of the present invention some additional compensation should be made for changes in the size of the load. In accordance with an important aspect of the invention, such compensation can at least partially be provided by operating the capacitor 52 on the nonlinear portion of its charging characteristic. Thus, in the illustrated examples given above, the SCR 54 may be assumed to have a fixed triggering level of approximately 0.4 volt. When a relatively small load is placed in the cavity 22, such as the soup in Example 1, a much higher field strength level exists in the cavity 22 so that the crystal 26 develops a relatively large voltage and the capacitor 52 is charged on the linear portion of its characteristic. However, with the relatively large load in Example No. 4, the field strength level is reduced by an amount such that the crystal output voltage to which the capacitor 52 is ultimately being charged is relatively small and may be only 0.5 volt. Under these conditions the triggering level of 0.4 volt for the SCR 54 is relatively close to the total voltage available for charging this capacitor and hence a disproportionately longer time is required to charge this capacitor to the triggering level of 0.4 volt at which the SCR 54 is fired.

While there is substantial compensation for the above described nonlinear relationship between field strength level and load size, this compensation is not complete, as shown by a comparison of Examples 1 and 4. Thus, in Example 1 the soup alone was heated to 198° F. whereas when included with other food items in Example 4 the soup was heated to only 190° F. before the SCR 54 was fired and microwave power was removed from the cavity 22. In addition to the inherent voltage-power nonlinear relationship, other possible sources of this kind of distortion include the voltage-current characteristic of the crystal detector and shifts in the standing wave pattern in the cavity as the loading changes.

Figure 8:
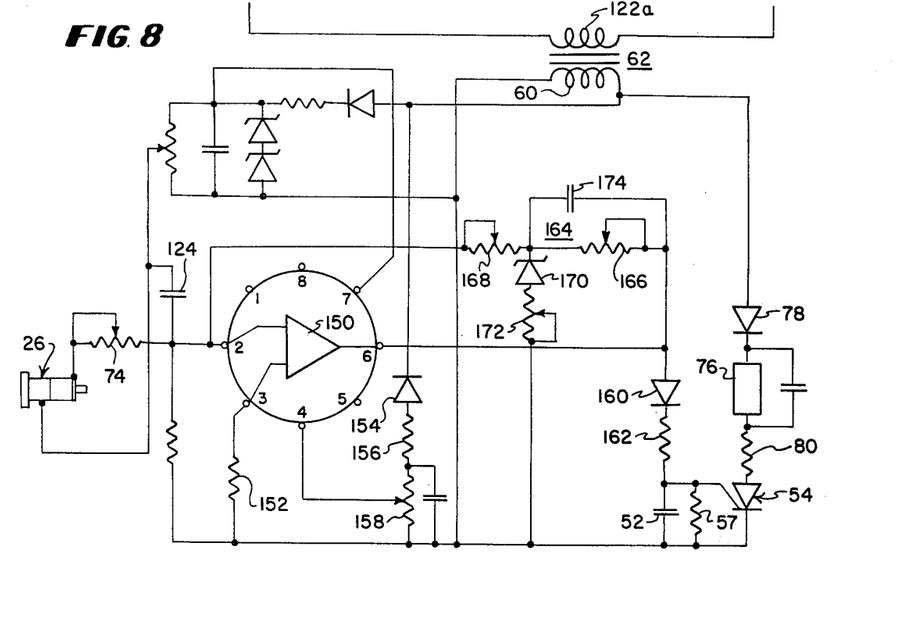
FIG. 8 is a further schematic diagram of another alternative embodiment of the invention wherein additional correction for nonlinearity is provided.

In accordance with a further aspect of the invention, further compensation for the above described nonlinear relationships may be provided by employing the circuit arrangement of FIG. 8 wherein the output from the crystal 26 is supplied to a nonlinear amplifier prior to being employed as a source of charging current for the capacitor 52. Thus, the rectified voltage appearing across the filter capacitor 124 is applied to the input terminal 2 of an operational amplifier, indicated generally at 150, which may be of the 741C type. A resistor 152 is connected from a second input terminal 3 of the op amp 150 to a common predetermined potential and an offset potential is developed by means of the diode 154, the series resistor 156 and the potentiometer 158 which are connected in series from one side of the transformer secondary winding 60 to a common predetermined potential, the wiper arm of the potentiometer 158 being connected to the terminal 4 op amp 150. The output terminal 6 of the op amp 150 is connected through the diode 160 and a series resistor 162 to the capacitor 52 which again controls conduction of the SCR 54 by controlling the point at which the gate electrode of this SCR is rendered sufficiently positive to cause the SCR 54 to fire.

Figure 9:
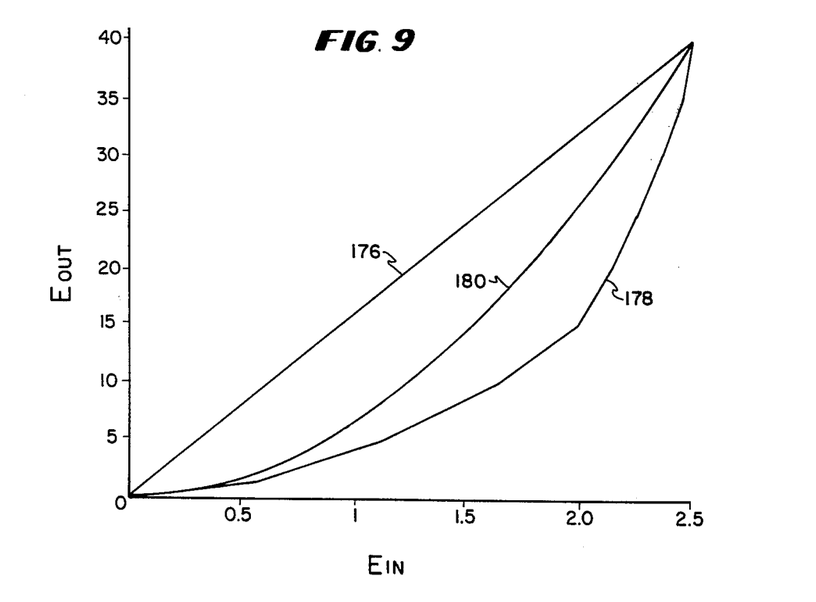
FIG. 9 is a graph illustrating the operation of the circuit of FIG. 8.

In the circuit of FIG. 8 a feedback network indicated generally at 164 is connected between the output terminal 6 of the op amp 150 and the input terminal 2 thereof so that the amplification characteristic of the op amp 150 may be varied over a wide range of values. More particularly, a pair of potentiometers 166 and 168 are connected between the terminals 6 and 2 of the op amp 150 and a Zener diode 170 has its cathode connected to the junction of these potentiometers to a common predetermined potential through a potentiometer 172. A capacitor 174 is connected across the potentiometer 166. The Zener diode 170 is rendered conductive when the output signal from the op amp 150 rises above about 4 volts. Accordingly, for output signals below this value full negative feedback is applied from the output to the input of the amplifier 150, whereas for output voltages above the conduction point of the Zener diode 170 a shunting effect is exercised by this diode so that less negative feedback is produced. The resultant output characteristic may be altered by proper adjustment of the potentiometers 166 and 168 so as to provide a nonlinear characteristic of the desired curvature. For example, when the potentiometer 172 is adjusted to a value of 9,000 ohms the Zener diode 170 is effectively open circuited so that the linear characteristic 176 shown in FIG. 9 is produced. In obtaining the characteristic 176, the potentiometer 166 had a value of 1,900 ohms and the potentiometer 168 had a value of 45,000 ohms. On the other hand, when the potentiometer 172 is adjusted to minimum resistance so that the Zener diode 170 has maximum effect, the characteristic 178 shown in FIG. 9 may be achieved. Under the conditions for characteristic 178, the potentiometer 166 had a value of 9,000, the potentiometer 168 had a value of 7,000 ohms and potentiometer 172 was short circuited. A calculated square law characteristic 180 falls between the two characteristics 176 and 178 and was matched almost perfectly when potentiometer 166 was 7,000 ohms, potentiometer 172 was 350 ohms and potentiometer 168 was 14,000 ohms. It is therefore evident that widely varying degrees of nonlinear output characteristic may be provided by proper adjustment of the potentiometers 166, 168 and 172. In this connection it will be understood that in a particular application the desired nonlinear characteristic could be determined by adjustment of the potentiometers 166, 168 and 172 and fixed resistors thereafter used in similar circuits.

The current developed by the crystal 26 is thus modified by means of the nonlinear amplifier circuit of FIG. 8 so that a nonlinear output current is provided for charging the capacitor 52. Accordingly, the circuit of FIG. 8 may be used directly to compensate for the nonlinear relationship between the field strength level measured by the crystal 26 and the microwave power absorbed by food items within the cavity 22. In the alternative, the nonlinearity afforded by the circuit of FIG. 8 may be employed in conjunction with the above described use of the capacitor charging characteristic to provide any degree of nonlinearity required in a particular application. In this connection it should be noted that yet other factors may require compensation in the crystal control circuit of the present invention. For example, a certain amount of heat loss is experienced by re-radiation from the food item being heated. In the case of the ferrite sensing element which is employed in my issued U.S. Pat. No. 3,854,022 the ferrite element also experiences re-radiation heat losses. However, the crystal detector arrangement of the present invention does not experience such heat loss due to re-radiation. The nonlinearity compensation arrangement described above may be used to compensate for re-radiation heat losses so that as the load is bigger and the field strength level decreases, additional time is provided to compensate for re-radiation heat losses. This additional time increment would be in addition to that required for the above described nonlinear relationship between field strength level and the power supply to the load.

Figure 10:
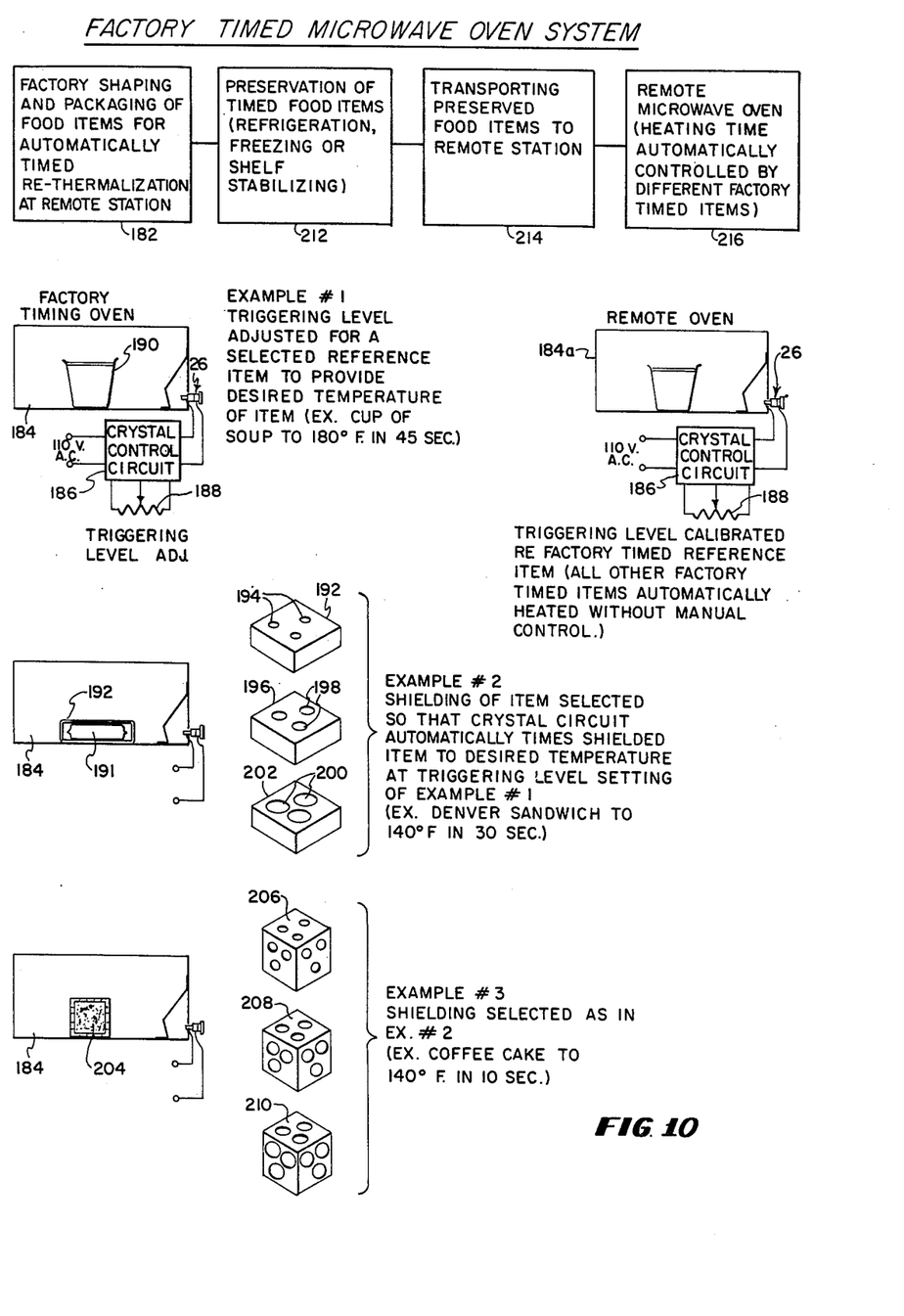
FIG. 10 is a block diagram illustrating the steps performed in carrying out applicant's factory timed microwave oven system embodying the control circuit arrangement of the present invention.

In accordance with a further aspect of the present invention, the above described crystal control circuit may be employed to provide a factory timed microwave oven system wherein individual food loads, or items on a common carrier or tray which collectively constitute a food load, may be prepared by suitable shaping and packaging at a remote factory location, such preparation being performed in conjunction with a standard microwave oven timing system having the crystal control circuit described in detail heretofore. The factory timed food load may then be used in remotely located microwave ovens on a fully automatic basis and without requiring a manual timer setting by the operator. Thus, as shown in FIG. 10, a factory timing operation is provided at a given location, as indicated by the block 182 in FIG. 10. At this location a factory standard oven indicated diagrammatically at 184 is employed, this oven being equipped with a crystal control circuit 186, such as described in detail heretofore and including the crystal 26, which measures the level of electromagnetic field strength within the cavity of the oven 184. A triggering level adjustment 188 is provided for the control circuit 186, this triggering level adjustment corresponding to either the bias potentiometer 72 or the series potentiometer 74 in the circuit of FIG. 6.

In carrying out the factory timing operation, the triggering level is first adjusted with a selected reference item so that the microwave energy to the cavity 184 will be terminated when that item has reached the desired temperature. Preferably, this reference item will comprise the item requiring the longest time interval for the application of microwave energy thereto per unit of weight thereof. For example, the reference item may comprise a cup of soup 190 which should be heated to a temperature of 180° F. in 45 seconds. The triggering level adjustment potentiometer 188 is adjusted so that when the cup of soup 190 is placed in the oven 184 microwave power will be supplied to the soup 190 for a period of 45 seconds so as to bring its temperature to 180° F. The remaining food items which are to be packaged and timed at the factory station 182 are then selectively shielded or shaped so that each item will be heated to the desired condition during the time interval required for the ramp signal developed in the control circuit 185 to reach the same triggering level as set in connection with the reference item described above. Selective shielding may be accomplished by wrapping the item in an energy reflecting foil which has one or more apertures therein suitable for admitting a desired amount of microwave energy to the item. In the alternative, a cardboard box coated with foil having apertures of the desired size or number may be employed. Thus, in Example No. 2, shown in FIG. 10, a Denver sandwich 191 may be wrapped in foil 192 which has relatively small apertures 194 therein, and placed in the oven 184. The oven door is then closed but the triggering level adjustment 188 is not changed from the setting of the adjustment potentiometer 188 for the reference item, i.e., the cup of soup described above, and the condition of the sandwich is noted when the timing interval is completed. If the Denver sandwich has not reached a sufficiently high temperature another sandwich is wrapped in foil 196 having larger or more numerous openings 198 therein and the same process is carried out. Successively larger openings, such as the openings 200 in the foil 202 may be selectively employed until the correct size of opening is chosen so that the Denver sandwich attains the desired temperature at the end of the timing interval. For example, the size of the openings in the foil may be chosen so that the sandwich will have a temperature of 140° F. with a timing interval of thirty seconds. In this connection it will be noted that the timed interval of thirty seconds is shorter than the time interval of forty-five seconds for the cup of soup because the shielding around the Denver sandwich has raised the level of electromagnetic field in the area of the crystal 26 so that the capacitor 52 (FIG. 6) is charged at a more rapid rate. Thus, by proper choice of the size of apertures in the foil which shields a particular food item the level of electromagnetic field strength, sensed by the crystal 26 may be correlated with the amount of energy admitted by these apertures to the food item so that the food item reaches the desired temperature in a time interval which does not require a different setting of the triggering level in the crystal control circuit 186.

In an entirely similar manner other food items such as a piece of coffee cake 204, shown in Example No. 3 in FIG. 10, may be selectively wrapped with foils having different sized apertures, such as the foils 206, 208 or 210 so that it will reach the desired condition for consumption in a timed interval established by the crystal control circuit 186 without changing the triggering level adjustment 188 thereof. For example, the coffee cake may be selectively shielded so as to reach a temperature of 140° F. in 10 seconds. In this connection, it should be noted that some food items may be physically shaped or molded so that they reach the desired condition during the timing interval over which microwave power is supplied. Such shaping may be in addition to or in place of the selective partial shielding described above.

For example, a 4 oz. boiled potato without the skin but otherwise intact will absorb less energy per unit of time than 4 oz. of potato in the form of mashed potatoes, particularly if the mashed potatoes are shaped in a thin layer. The mashed potatoes will typically be heated to the desired temperature when the oven setting is adjusted with the reference item being a cup of soup. However, the boiled potato while having the same weight as the mashed potatoes will absorb considerably less energy per unit of time which in turn results in the crystal sensor receiving more energy per unit of time. The oven is thus turned on for a shorter length of time and the boiled potato does not reach the same temperature as the mashed potatoes. However, by suitably shaping the boiled potato, as by cutting it into two or more pieces and thereby increasing the energy absorbed per unit of time, the boiled potato can be properly factory timed to achieve the same desired serving temperature as the mashed potatoes. In this connection, it will be understood that some items on a common carrier or tray may be physically shaped, as described above, to achieve proper factory timing while other items on the same tray and/or the physically shaped items may be selectively shielded to achieve a desired factory timing of the entire food load.

After the food items have been selectively timed at the factory location 182, they may be preserved in any desired manner, as indicated by the block 212 in FIG. 10. For example, the food items which have been selectively shielded may be frozen or shelf stabilized in any desired manner, it being understood that the timing required for these items when re-thermalized is automatically built into the item by means of the above described selective shielding. The stored food items may then be transported by any desired arrangement to remote locations, such as a restaurant, home or vending apparatus, as indicated by the block 214 in FIG. 10. At these remote stations a remote microwave oven 216 is employed to control automatically the heating of any factory timed food item without requiring individual food item adjustments on the part of the operator. Thus, at the remote location a microwave oven 184a is employed which is substantially identical to the microwave oven 134 employed in the above described factory timing operation. The crystal control circuit 186 thereof is then set by adjusting the potentiometer 188 so that the reference food item, such as the cup of soup described in detail heretofore, is heated to the desired temperature at the time of automatic termination of microwave power to the cavity. In making this adjustment, compensation for slight variations from oven to oven in manufacturing is provided. Once this adjustment is made, the oven 184a may thereafter be employed to provide automatic timing of any food item which has been factory timed in the manner described heretofore without requiring manual adjustment of the potentiometer 188 or any other manual control. Thus, when a Denver sandwich has been factory timed in the manner described above is placed in the oven 184a the oven will remain on for a period of time sufficient to heat it to the desired temperature also. In a similar manner when a selectively shielded coffee cake item is placed in the oven 184a, the oven will remain on for the time required to properly heat it. These different timing intervals are all accomplished automatically in accordance with the above described factory timed arrangement wherein the crystal control circuit 186 is employed. Furthermore, several factory timed food items may be properly placed in the cavity at the same time and all of these items can be brought to the desired condition automatically, as described in detail heretofore. It will also be noted that the initial adjustment of the potentiometer 188 can be altered for a particular remote application where the desired temperatures may be higher or lower than the norm. For example, a restaurant may have one oven adjusted to provide higher temperatures for factory timed items which are carry outs and another oven set to provide lower temperatrues for the same factory timed items to be consumed in the restaurant.

While there have been described what are at present considered to be the preferred embodiments of the invention, it will be understood that various modifications may be made therein which are within the true spirit and scope of the invention.

What is claimed as new and desired to be secured by Letters Patent is:

1. The method of rethermalizing previously prepared foods for consumption which comprises the steps of:
   preparing at a first location, a package of food items for subsequent rethermalization at a second location, said preparing including placing said package in a first predesignated microwave oven cavity, sensing an electromagnetic field with said food package in said oven cavity, developing an electrical signal from said sensed electromagnetic field proportional to the level of microwave energy in said oven cavity when said food package is placed therein, heating a selected individual food item to a desired temperature, and selectively shielding the remaining food items so that each item reaches a desired temperature in the same time as the selected food item;

integrating the voltage level produced by said electrical system at an established rate producing an established voltage level coincident in time for said food items reaching their desired temperatures;

storing said prepared food items to prevent spoilage thereof;

transporting said stored food items to said second location;

placing said package of food items in a second predesignated microwave oven cavity at said second location, said second predesignated microwave oven being similar to said first microwave oven and being calibrated to integrate at said established rate electrical signals proportional to the microwave energy level in said cavity and to retain as a reference signal said established voltage level, and monitoring the value of the integration of said distinctive electrical signals and terminating the application of microwave energy when the value of said integration coorresponds to the value of said reference signal.

2. The method of rethermalizing previously prepared foods for consumption which comprises the steps of:

preparing at a first location, a package of food items for subsequent rethermalization at a second location, said preparing including placing said package in a first predesignated microwave oven cavity, sensing an electromagnetic field with said food package in said oven cavity, developing an electrical signal from said sensed electromagnetic field proportional to the level of microwave energy in said oven cavity when said food package is placed therein, heating a selected individual food item to a desired temperature, and selectively shaping the remaining food items so that each item reaches a desired temperature in the same time as the selected food item, integrating the voltage level produced by said electrical system at an established rate producing an established voltage level coincident in time for said food items reaching their desired temperature;

storing said prepared food items to prevent spoilage thereof;

transporting said stored food items to said second location;

placing said package of food items in a second predesignated microwave oven cavity at said second location, said second predesignated microwave oven being similar to said first microwave oven and being calibrated to integrate at said established rate electrical signals proportional to the microwave energy level in said cavity and to retain as a reference signal said established voltage level, and monitoring the value of the integration of said electrical signals and terminating the application of microwave energy when the value of said integration corresponds to the value of said reference signal.

3. The method of rethermalizing previously prepared foods for consumption which comprises the steps of:

preparing at a first location, a package of food items for subsequent rethermalization at a second location, said preparing including placing said package in a first predesignated microwave oven cavity, sensing an electromagnetic field with said food package in said oven cavity, developing an electrical signal from said sensed electromagnetic field proportional to the level of microwave energy in said oven cavity when said food package is placed therein, heating a selected individual food item to a desired temperature, and selectively shielding and shaping the remaining food items so that each item reaches a desired temperature in the same time as the selected food item, integrating the voltage level produced by said electrical system at an established rate producing an established voltage level coincident in time for said food items reaching their desired temperatures;

storing said prepared food items to prevent spoilage thereof;

transporting said stored food items to said second location;

placing said package of food items in a second predesignated microwave oven cavity at said second location, said second predesignated microwave oven being similar to said first microwave oven and being calibrated to integrate at said established rate electrical signals proportional to the microwave energy level in said cavity and to retain as a reference signal said established voltage level, and monitoring the value of the integration of said electrical signals and terminating the application of microwave energy when the value of said integration corresponds to the value of said reference signal.

4. The method of claim 3 wherein the step of monitoring the value of the integration of said electrical signals further includes the step of terminating the application of microwave energy only when the value of said integration exceeds the value of said reference signal by a predetermined amount.

5. The method of claim 3 wherein the step of monitoring the value of the integration of said electrical signals further includes the step of terminating the application of microwave energy only when the value of said integration is less than the value of said reference signal by a predetermined amount.

* * * * *